(12) United States Patent
Dunshea et al.

(10) Patent No.: US 8,447,955 B2
(45) Date of Patent: *May 21, 2013

(54) EFFICIENT MEMORY UPDATE PROCESS FOR WELL BEHAVED APPLICATIONS EXECUTING ON A WEAKLY-ORDERED PROCESSOR

(75) Inventors: Andrew Dunshea, Austin, TX (US); Satya Prakash Sharma, Austin, TX (US); Mysore Sathyanarayana Srinivas, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1091 days.

This patent is subject to a terminal disclaimer.

(21) Appl. No.: 12/259,699

(22) Filed: Oct. 28, 2008

(65) Prior Publication Data

US 2009/0049278 A1 Feb. 19, 2009

Related U.S. Application Data

(62) Division of application No. 11/006,371, filed on Dec. 7, 2004, now Pat. No. 7,454,570.

(51) Int. Cl.
*G06F 9/30* (2006.01)

(52) U.S. Cl.
USPC .......................................... 712/220

(58) Field of Classification Search
None
See application file for complete search history.

(56) References Cited

U.S. PATENT DOCUMENTS

2004/0068607 A1* 4/2004 Narad ........................... 711/108
2004/0205313 A1* 10/2004 Hudson et al. ................ 711/163

* cited by examiner

*Primary Examiner* — Robert Fennema
(74) *Attorney, Agent, or Firm* — Yudell Isidore Ng Russell PLLC

(57) ABSTRACT

A multiprocessor data processing system (MDPS) with a weakly-ordered architecture providing processing logic for substantially eliminating issuing sync instructions after every store instruction of a well-behaved application. Instructions of a well-behaved application are translated and executed by a weakly-ordered processor. The processing logic includes a lock address tracking utility (LATU), which provides an algorithm and a table of lock addresses, within which each lock address is stored when the lock is acquired by the weakly-ordered processor. When a store instruction is encountered in the instruction stream, the LATU compares the target address of the store instruction against the table of lock addresses. If the target address matches one of the lock addresses, indicating that the store instruction is the corresponding unlock instruction (or lock release instruction), a sync instruction is issued ahead of the store operation. The sync causes all values updated by the intermediate store operations to be flushed out to the point of coherency and be visible to all processors.

12 Claims, 2 Drawing Sheets

EFFICIENT MEMORY UPDATE PROCESS FOR WELL BEHAVED APPLICATIONS EXECUTING ON A WEAKLY-ORDERED PROCESSOR

PRIORITY CLAIM

The present application is a divisional of U.S. patent application Ser. No. 11/006,371, filed on Dec. 7, 2004, titled "Efficient Memory Update Process For On-The-Fly Instruction Translation For Well Behaved Applications Executing On A Weakly-Ordered Processor;" the contents of which is incorporated herein by reference.

BACKGROUND OF THE INVENTION

1. Technical Field

The present invention relates generally to computer systems and more specifically to memory access operations on a computer system with a weakly-ordered architecture. Still more particularly, the present invention relates to memory access operations of a well-behaved application executing on a computer system with a weakly-ordered processor and memory subsystem.

2. Description of the Related Art

Memory access operations of data processing systems were traditionally executed in order (i.e., the order in which the instructions are written in the application code) using highly-order processors and completed in order at the memory subsystem. With highly-ordered processors, such as Intel's X86 processors, memory access instructions (e.g., store instructions) strictly follow the processing order to ensure that no conflicts occur at the memory subsystem.

Advancements in processor and cache memory technology have led to the creation of weakly-ordered processors (e.g., International Business Machine's "PowerPC" family of processors), which enable weakly-ordered (or out-of-order) processing of instructions (including memory access instructions) and are typically faster than the highly-ordered processors. Thus, unlike the highly ordered processor, a weakly ordered processor typically processes some instructions, including memory access instructions, out-of-order relative to each other.

In order to further enhance performance, state-of-the-art data processing systems often utilize multiple processors which concurrently execute portions of a given application/task. These multiple processor (MP) data processing systems (hereinafter referred to as "MDPS") often utilize a multi-level memory hierarchy to reduce the access time required to retrieve data from memory. A MDPS may include a number of processors, each with an associated level-one (L1) cache, a number of level-two (L2) caches, and a number of modules of system memory. Typically, the memory hierarchy is arranged such that each L2 cache and system memory module is coupled to a system bus or interconnect switch, such that an L2 cache within the MDPS may access data from any of the system memory modules coupled to the bus or interconnect switch.

Because each of the number of processors within a MDPS may modify data, MDPS typically employ a protocol to maintain memory coherence. For example, MDPS utilizing PowerPC RISC processors utilize a MESI or similar coherency protocol. Those skilled in the art are familiar with such coherency protocols.

On-the-fly instruction translation between different processor types in a MDPS is becoming more viable as processor technology moves towards the faster, weakly-ordered processors. When one or more weakly-ordered processors are being utilized to execute instructions of a well-behaved application written for a highly ordered processor, protecting the order of memory access instructions at the memory subsystem is handled by introducing memory barrier instructions.

Sync instructions are issued after each store operation of a translated, well-behaved application to flush the updated values of a store operation from the processor cache (e.g., L1 write back cache) to a point of coherency in the memory subsystem. The sync provides visibility to the other processors of updates to a memory location by the particular processor executing instructions of the well-behaved application. Thus, in conventional MDPS, maintaining the order of stores while allowing visibility of the store operations to other processors executing instructions of the well-behaved application requires that each store operation executed by a weakly-ordered processor be followed by a sync instruction.

When multiple different processors are able to update a memory block during execution of an application, serialization of these updates is provided using a lock instruction. The lock instruction is a specialized instruction, which enables a processor that is executing an application being concurrently processed by multiple processors to automically update the memory block before another processor is permitted to update the memory block. Locks are thus provided when executing well-behaved applications to provide some level of serialization in updating these shared memory blocks. Those skilled in the art are familiar with the use of locks to enable serialized access of multiple processors to specific blocks memory.

In conventional systems, translation of lock instructions of a well-behaved application for execution on a weakly-ordered processor involves identifying the lock instructions, translating the lock instruction, then providing a following sync instruction. Conventionally, when a lock is being acquired, the acquiring processor issues a sync to make the lock visible to the other processors. The other processors would then not update the memory block until the lock is released. The lock is later released using a simple store operation targeting the lock address.

During the lock phase, once the lock is taken, multiple intermediate store instructions may be executed by the processor, and some of these updates may not be made visible to the other processors. There is no way of knowing when the lock is released and/or determining which stores have been made visible to the other processors. Thus, with conventional systems, syncs have to be introduced after each intermediate store operation to make the store visible to the other components (at the point of coherency) as they are occurring.

Thus, when performing on-the-fly translation of the well-behaved application code into instructions for executing on the weakly-ordered processor, each store operation that affects/updates the point of coherency is immediately followed by a sync to insure visibility. Given the substantial number of memory operations that may be scheduled during execution of the well-behaved application, sync operations are required to be inserted into the execution stream for the weakly-order processor to make the intermediate updates visible to the other processors.

There are several performance limitations with the on-the-fly translation of application code of a well-behaved application for execution on a weakly-ordered processor (i.e., application created for execution within a highly-ordered architecture being executed within a weakly-ordered architecture). As is clear from the above description, the change in processor architecture causes the translation of the instructions to not be sufficient to guarantee correct operation of the application, and syncs are introduced into the code after each store instruction.

Thus, when a well-behaved application is being executed, and protected shared structures are accessed within the context of locks, there is a built in penalty attributed to the application. This penalty is caused by the overhead of ensuring synchronization for each store instruction. While issuing a sync instruction after each store provides a solution to translating between a highly ordered architecture and a weakly ordered architecture, testing has shown that the overhead introduced for issuing these sync instructions after each store is very significant.

In one example, an application compiled for the IBM Power platform (i.e., with no on-the-fly instruction translation) exhibited a near 200% degradation in performance when a sync instruction is inserted after each store. The overhead may change depending on the application, however, most applications typically have a very high percentage of store operations, and thus, for most well-behaved applications, this overhead remains very significant.

SUMMARY OF THE INVENTION

Disclosed is a multiprocessor data processing system (MDPS) with a weakly-ordered architecture providing processing logic for substantially eliminating issuing a sync instruction after every store instruction of a well-behaved application to guarantee consistency. Instructions of a well-behaved application are translated, and the translated instructions are executed by a weakly-ordered processor. The processing logic includes a lock address tracking utility (LATU), which provides an algorithm and a table of lock addresses, within which each lock address is stored when the lock is acquired by the weakly-ordered processor.

During the period in which the processor has the lock (i.e., the lock phase), "intermediate" stores may or may not be made visible to the other processors (at the point of memory coherency). Thus, when a store instruction is encountered in the instruction stream, the LATU compares the target address of the store instruction against the table of lock addresses. If the target address matches one of the lock addresses, indicating that the store instruction is the corresponding unlock instruction (or lock release instruction), a sync instruction is issued ahead of the store operation. The sync causes all values updated by the intermediate store operations (e.g., values held in the processor's write back cache or registers) to be flushed out to the point of coherency and be visible to all processors.

LATU thus provides additional instructions/code to protect the barrier of the lock whenever the lock has an address entry in the table. Lock addresses are easily identified in the execution path because the lock instruction contains well known sequences which are used to guarantee the atomic nature of the lock operations. These coding constructs are identified, and the LATU builds the table of lock addresses. Once the lock is released, the lock address is removed from the table. Penalty/overhead incurred when issuing multiple syncs following each intermediate store operation in conventional systems is eliminated. Finally, implementation of the LATU provides an optimization for well-behaved applications executing on weakly-ordered processors as all intermediate stores are made visible to the processors, without issuing individual syncs following each intermediate store.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

Figure 1:
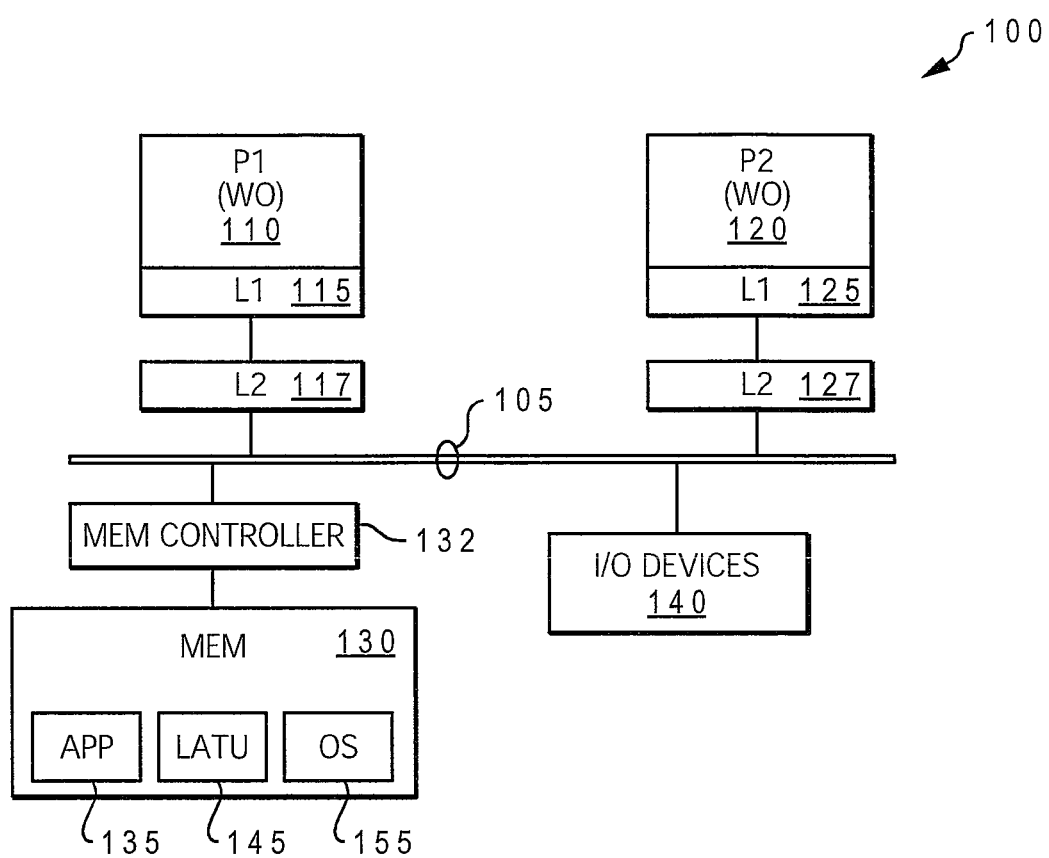
FIG. 1 is a block diagram illustrating a multiprocessor data processing system with a weakly-ordered processor within which the various features of the invention may advantageously be implemented.

The present invention provides a multiprocessor data processing system (MDPS) with a weakly-ordered architecture having processing logic for substantially eliminating issuing a sync instruction after every store instruction of a well-behaved application to guarantee consistency. Instructions of a well-behaved application are translated, and the translated instructions executed by a weakly-ordered processor. The processing logic includes a lock address tracking utility (LATU), which provides an algorithm and a table of lock addresses, within which each lock address is stored when the lock is acquired by the weakly-ordered processor.

During the period in which the processor has the lock (i.e., the lock phase), "intermediate" stores may or may not be made visible to the other processors (at the point of memory coherency). Thus, when a store instruction is encountered in the instruction stream (e.g., at the point at which translation occurs or just prior to execution), the LATU compares the target address of the store instruction against the table of lock addresses. If the target address matches one of the lock addresses, indicating that the store instruction is the corresponding unlock instruction (or lock release instruction), a sync instruction is issued ahead of the store operation. The sync causes all values updated by the intermediate store operations (e.g., values held in the processor's write back cache or registers) to be flushed out to the point of coherency and be visible to all processors.

LATU thus provides additional instructions/code to protect the barrier of the lock whenever the lock has an address entry in the table. Lock addresses are easily identified in the execution path because the lock instruction contains well known sequences which are used to guarantee the atomic nature of the lock operations. These coding constructs (e.g., LARX, or lock cmpexhange, etc.) are identified, and the LATU builds the table of lock addresses. Once the lock is released (i.e., the corresponding unlock "store" instruction is identified in the execution stream), the lock address is removed from the table. Penalty/overhead incurred when issuing multiple syncs following each intermediate store operation in conventional systems is eliminated. Finally, implementation of the LATU provides an optimization for well-behaved applications executing on weakly-ordered processors as all intermediate stores are made visible to the processors, without issuing individual syncs following each intermediate store.

Several terms are utilized in the invention, and these terms are defined as follows:
  (1) point of coherency: a point in the memory subsystem at which coherency of memory operations is maintained. In the illustrative embodiment, the point of coherency may be either the L2 cache or the lower level memory;

(2) visibility: refers to the state at which an update to a memory block is made visible to the processors (and other components) of the system. Visibility occurs when the data is placed at the point of coherency.

(3) sync: generally referring to any instruction or operation that is utilized to make all caches consistent to the point of coherency, thus making store operations visible to the other processors. A sync may be utilized to flush data from a write back cache (e.g., L1 cache) of the processor to the point of coherency.

In addition to the above definitions, all store instructions issued while the processor has a lock (i.e., during a lock phase) and which are not themselves the "unlock" (or lock release) instruction are referred to herein as "intermediate" store instructions. These intermediate store instructions may update the processor's write back cache during a lock phase, but may or may not forward the update to the point of coherency, until a sync is issued. According to the illustrative embodiment, the sync is issued to insure visibility of the intermediate stores when the unlock instruction is detected during following instruction translation.

The invention is preferably implemented in a multiprocessor data processing system (MDPS) with a weakly ordered architecture comprising one or more weakly-ordered processors, similar to MDPS 100 illustrated by FIG. 1, which is now described. MDPS 100 comprises two processors, P1 110 and P2 120, connected to each other and to memory controller 132 of shared lower level memory 130 via a system bus 105. Memory controller 132 controls access to and from memory 130 by processors P1 110 and P2 120 and any other component that may access and/or update memory 130. Also connected to system bus 105 are input/output (I/O) devices 140 (shown collectively as a single block).

In the illustrative embodiment, processor P1 110 is a weakly-ordered processor, while processor P2 120 is a highly-ordered processor. Each processor has respective internal processor caches, L1 cache 115 and L1 cache 125, and respective level two (L2) caches, L2 cache 117 and L2 cache 127. L1 and L2 caches are utilized by the processors to temporarily store data values of memory locations during processing and reduce memory access latency.

The combination of processor L1 caches 115 and 125, L2 caches 117 and 127, and memory 130 provide a coherent memory subsystem that requires updates to memory addresses to be serialized (amongst processors and other system components that may access memory subsystem). According to the illustrative embodiment, this serialization is achieved using a coherency protocol (e.g., MESI protocol) and a combination of locks and synchronization (sync) instructions, as further described below. As mentioned above, the point of coherency for MDPS 100 may be at L2 caches 117, 127 or memory 130. Also, L1 caches 115, 125 are assumed to be write back caches, thought not necessarily so.

While MDPS 100 is depicted with a specific configuration and/or combination of caches and memory, this configuration is provided solely for illustration, and not meant to imply any limitations on the memory structure being utilized or available to a MDPS implementing the features of the invention. Thus, for example, MDPS 100 may have several other levels of caches and multiple different lower level memory structures. Also, any one of the lower level caches L2, etc., may be shared among multiple processors. These and other alternate configurations all fall within the scope of the invention.

Within memory 130 are software programs, including operating system (OS) 155, application program 135, and lock address tracking utility (LATU) 145. Application program 135 is a well-behaved application program that requires processing of its instruction code in a manner similar to that provided by a highly-ordered processor (e.g., P2 120). In the illustrative embodiment, described herein, application program 135 includes instructions that are being translated for execution on weakly-ordered processor P1 110. Also, application program 135 is assumed to be executed by both processors in a shared manner, such that both processors may update similar blocks of a memory location being utilized by the application.

LATU 135 is a specialized utility, which provides a table (or other link list type construct) for storing lock addresses. LATU 135 also provides an algorithm for: (1) identifying a lock operation when the lock is being acquired by a processor (P1 110), (2) address copying and storing the lock address in the table, and (3) determining when an "unlock" (or lock release) operation is being scheduled to release the specific lock by tracking the addresses of scheduled store operations within the translated instruction sequence.

The algorithm of LATU 135 further (4) generates or causes to be generated and issued a sync operation before each unlock instruction is executed to trigger the processor holding the lock to flush all memory updates stored in the processor cache during the lock phase (by intermediate stores) out to the point of coherency. This assures visibility of these stores to all other processors. Finally, the algorithm (5) updates the table of lock addresses by removing the address of a lock when the lock is released (unlocked).

The invention is described with reference to the above described MDPS 100 and internal hardware and software components. However, it is understood that the above described embodiment is merely for illustration and not meant to imply any limitations on the actual structural design/configuration of the data processing system. Further, while described as a utility separate from the processors and OS, it is understood that the functional features of the invention may be programmed into the processors or memory controller 132 as a software utility or provided within the coherency protocol, OS, or general processor/controller logic. Thus, for example, LATU 135 may be a component of OS 155 or independent of OS 155 depending on the specific implementation provided by the system designer.

Implementation of the invention requires recognition that the lock release (or "unlock") operation is simply a specific store operation to the lock address. Utilizing this recognition, the invention introduces a high-level lock processing method (via LATU) that removes the previously invisible (to the processor and other system components) processing of the unlock operation and enables visibility to other intermediate stores as well.

The following example is provided of a well-behaved instruction sequence that includes a lock operation that is translated for execution by a weakly-ordered processor. Translation of a lock instruction triggers the LATU to track the lock and subsequently issues a sync when the lock is about to be released (i.e., the unlock instruction is encountered in the instruction sequence). The example utilizes the load reserve (LARX) and store conditional (STCX) instruction pair to represent the lock operation from the well-behaved application that is being translated.

The example provides a very specific case of on-the-fly instruction translation that occurs between a highly ordered processor (such as Intel "x86" processor) and a weakly-ordered processor (such as IBM "Power" processor). The specific processor types and resulting translated code are provided for illustration only and not meant to imply any limitations on the invention. Comments are presented delineated by "<>" characters to explain some of the code as well as certain operations undertaken by the Power processor. Three periods of operation are indicated, a lock acquisition period, a lock phase, and an unlock period.

| Processor | Instruction(x86)/Translated Code(Power) |
|---|---|
| | A. lock acquisition |
| x86 | lock cmpxchg rlm,r |
| | <LATU algorithm adds the address "rlm" to the lock address look-up table.> |
| Power: | lwarx rD,0,rA |
| | stwcx rS,0,rA |
| | isync |
| | (In the instruction sequence, (rS is source, 0 is the displacement, and rA is the address) |
| | B. lock phase |
| X86 | (stores to processor cache and memory) |
| Power: | (stores to processor's write back cache) |
| | (withhold issuance of a sync following each store operation) |
| | <Instructions executed while lock is held; stores may not be visible to other processors, unless a pre-programmed sync instruction is issued> |
| | C. Atomic release of lock (unlock) |
| x86 | mov rlm,r |
| Power: | lwsync |
| | stw rS,0,rA |
| | <LATU algorithm gets a hit for "rlm" in the lock address look-up table.> |
| | <lwsync issued before unlock instruction to guarantee visibility of all stores> |
| | <address "rlm" is removed from the lock address look-up table by LATU.> |

Figure 2:
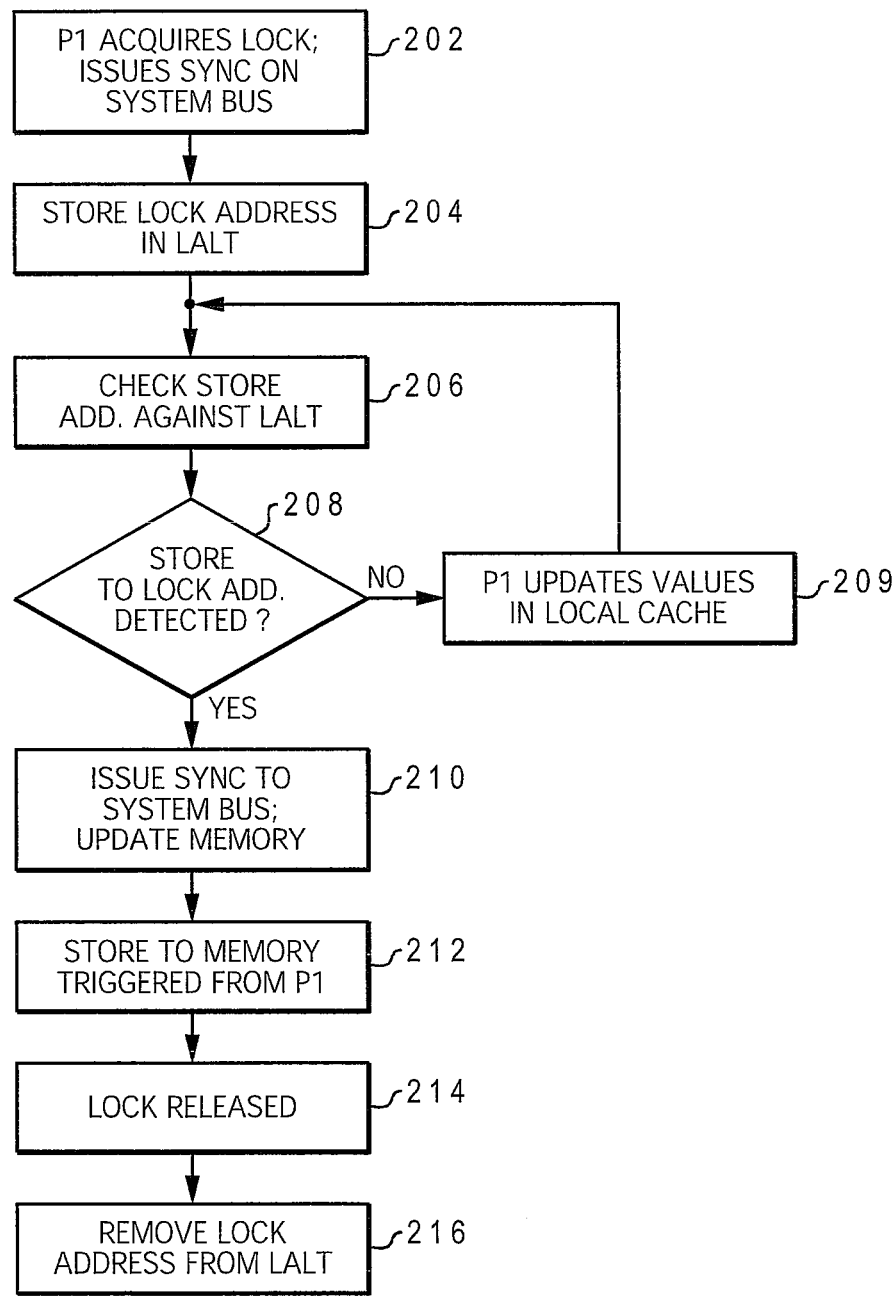
FIG. 2 is a flow chart of the processing that occurs during a lock phase that eliminates the need for syncs after each store instruction according to one embodiment of the invention.

FIG. 2 is a flow chart illustrating the process of tracking lock operations while executing instructions of a well-behaved application at a weakly ordered processor, according to one embodiment of the invention. The process begins at block 202 at which weakly-ordered processor P1 110 acquires the lock and issues a sync operation to make visible to all other processors that P1 110 has obtained the lock. When the lock is being acquired, the lock address is copied (by LATU) and stored in the table of lock addresses, as shown at block 204.

The specific configuration and method of implementing the lock address look-up table is left up to the MDPS designer/manufacturer and/or LATU code developer. One embodiment utilizes a simple array of held lock addresses. Such an implementation is adequate and viable because the number of held/stored lock addresses at any one time is small. In addition, updates to the table only occurs when a lock is taken or released, and therefore, the over-head of maintaining the list is also relatively small in comparison to the number of total instructions being executed at the processor(s).

In another embodiment, a simple link-list table is provided that is searchable for lock addresses. In one implementation, the lock addresses are maintained in order within the table. Then, because the lock addresses are held in order, searching within the table is more efficient. That is, a sequential search for a lock address may be aborted once the store address value being used in the search exceeds the lock address value at the current search position in the table. Insertion and deletion of lock addresses is efficient for the number of locks expected, and the table may be quickly checked for existent of locks. When using a link list, a check is completed only when the link list contains a non-null root.

Returning to FIG. 2, during the ensuing lock phase, the application code is translated prior to execution, and the target address of each store instruction is checked against the lock addresses in the table, as indicated at block 206. Thus, whenever a store instruction is detected during a lock phase at P1 110, the LATU compares the target address of the store instruction with the lock addresses within the table. A determination is then made at block 208 whether the target address of the store operation matches any of the lock addresses within the table (i.e., whether a store to a lock address is detected). When the store targets a different address than the lock address (i.e., an intermediate store instruction), P1 110 may update one or more values in the local cache, as indicated at block 209.

Otherwise, when the target address of the store instructions matches one of the lock addresses in the table, a sync instruction is generated and issued to the system bus at block 210. This sync flushes all values updated during the lock phase (stored within processor cache by intermediate store operations) out to the point of coherency, making the values all visible. P1 110 then executes the unlock instruction at block 212, and the lock is atomically released as indicated at block 214. Once the lock is released, the lock address is removed from the table, as described at block 216.

One benefit realized by the invention is a substantial reduction in the significant overhead and performance penalty cause by placing a sync after every store in conventional systems. Further, removing the sync on intermediate store operations provides an optimization for well behaved applications being executed on weakly-ordered processor architectures. The LATU removes the penalty/overhead on the application while still ensuring synchronization for each of the stores occurring during the lock phase. Implementation of the features of the invention provides a significant performance improvement.

In an alternate embodiment, syncs are issued for every store operation once the lock is taken by the processor. The weakly-ordered processor may be designed with a special "lock" flag that is settable by the executing application. The lock flag is a global flag that can be set to one of two possible values. On one implementation, the lock flag is a single bit that is set to zero or 1, with a default value preset. The first value indicates that syncs are to be issued after every store instruction during the lock phase without tracking the lock, while the second value indicates that the lock has to be tracked and a sync issued just prior to the issuing the unlock operation. The tracking is provided using the functionality of LATU and the table of lock addresses.

Selection of the first or second value is completed when the application is first loaded on the system for processing. The application may exhibit characteristics different from that of a well-behaved application. The programmer of the application code provides a command that sets the value of the lock flag, depending on pre-determined operational characteristics of the application code when executing on a weakly-ordered processor.

The invention eliminates the overhead (of syncs) during store operations for well-behaved applications and thus provides an optimization for well-behaved applications. More significantly, the invention improves overall performance benefits for well-behaved applications executing on a weakly-ordered processor by a significant percentage.

As a final matter, it is important that while an illustrative embodiment of the present invention has been, and will continue to be, described in the context of a fully functional computer system with installed management software, those skilled in the art will appreciate that the software aspects of an illustrative embodiment of the present invention are capable of being distributed as a program product in a variety of forms, and that an illustrative embodiment of the present invention applies equally regardless of the particular type of signal bearing media used to actually carry out the distribution. Examples of signal bearing media include recordable type media such as floppy disks, hard disk drives, CD ROMs, and transmission type media such as digital and analogue communication links.

While the invention has been particularly shown and described with reference to a preferred embodiment, it will be understood by those skilled in the art that various changes in form and detail may be made therein without departing from the spirit and scope of the invention.

What is claimed is:

1. In a multiprocessor data processing system having at least one weakly-ordered processor and a memory subsystem, a method comprising:
   performing on-the-fly translation of one or more store instructions of a well-behaved application executing on the at least one weakly-ordered processor;
   identifying a lock instruction in the one or more store instructions;
   in response to identifying the lock instruction, entering a lock phase, wherein during the lock phase store instructions of the at least one weakly-ordered processor are not visible to the other processors in the multiprocessor data processing system, and wherein during the lock phase the at least one weakly-ordered processor performs the functions of:
      issuing one or more intermediate store instructions, wherein the one or more intermediate store instructions are issued without individual sync instructions following each intermediate store operation;
      tracking a lock operation of the well-behaved application executing on the at least one weakly-ordered processor;
      detecting when an unlock operation corresponding to the lock operation is scheduled to release a lock operation;
      in response to detecting the unlock operation is about to be performed to release the lock operation:
         generating a sync instruction to be issued before the unlock operation is executed; and
         issuing the generated sync instruction before the unlock operation is executed, wherein the sync instruction guarantees visibility of all of the one or more intermediate store instructions to a point of coherency within the memory subsystem;
   determining the value of the lock flag from among one of two values the lock flag can be set to, wherein a first value indicates that sync instructions are to be issued following each store operation, and wherein the second value indicates that sync instructions are not be issued following each store operation during a lock phase;
   detecting when a well-behaved application is loaded for execution on the at least one weakly-ordered processor;
   in response to detecting loading of the well-behaved application on the at least one weakly-ordered processor, setting the lock flag to the second value; and
   in response to the lock flag being set to the first value, issuing sync instructions following each store operation of the well-behaved application.

2. The method of claim 1, further comprising:
   in response to detecting the unlock operation has been executed, removing a lock address corresponding to the lock instruction from a table of lock addresses.

3. The method of claim 1, wherein the unlock operation is encountered in the instruction sequence.

4. In a multiprocessor data processing system having at least one weakly-ordered processor and a memory subsystem, a method comprising:
   executing one or more store instructions of a well-behaved application executing on the at least one weakly-ordered processor;
   identifying a lock instruction in the one or more store instructions; and
   in response to identifying the lock instruction, entering a lock phase, wherein during the lock phase store instructions of the at least one weakly-ordered processor are not visible to the other processors in the multiprocessor data processing system, and wherein during the lock phase the at least one weakly-ordered processor performs the functions of:
      issuing one or more intermediate store instructions, wherein the one or more intermediate store instructions are issued without individual sync instructions following each intermediate store;
      tracking a lock operation of a well-behaved behaved application executing on the at least one weakly-ordered processor;
      detecting when an unlock operation corresponding to the lock operation is scheduled to release a lock operation;
      in response to detecting the unlock operation is about to be performed to release the lock operation:
         generating a sync instruction to be issued before the unlock operation is executed; and
         issuing the generated sync instruction before the unlock operation is executed, wherein the sync instruction guarantees visibility of all of the one or more intermediate store instructions to a point of coherency within the memory subsystem;
   determining the value of the lock flag from among one of two values the lock flag can be set to, wherein a first value indicates that sync instructions are to be issued following each store operation, and wherein the second value indicates that sync instructions are not be issued following each store operation during a lock phase;
   detecting when a well-behaved application is loaded for execution on the at least one weakly-ordered processor;
   in response to detecting loading of the well-behaved application on the at least one weakly-ordered processor, setting the lock flag to the second value; and
   in response to the lock flag being set to the first value, issuing sync instructions following each store operation of the well-behaved application.

5. The method of claim 4, further comprising:
   in response to detecting the unlock operation has been executed, removing a lock address corresponding to the lock instruction from a table of lock addresses.

6. The method of claim 4, wherein the unlock operation is encountered in the instruction sequence.

7. A multiprocessor data processing system comprising:
   at least one weakly-ordered processor;
   a memory subsystem; and
   logic that when executed by the at least one weakly-ordered processor determines the value of a lock flag of the at least one weakly-ordered processor; and in response to determining the lock flag is set to a second value, activates a lock acquisition tracking utility (LATU), the LATU performing a set of functions that:
      identifies a lock instruction in one or more store instructions of the at least one weakly-ordered processor; and
      in response to identifying the lock instruction, enters a lock phase, wherein during the lock phase store instructions of the at least one weakly-ordered processor are not visible to other processors in the multiprocessor data processing system, and wherein during the lock phase the LATU performs the functions of:
- issues one or more intermediate store instructions, wherein the one or more intermediate store instructions are issued without individual sync instructions following each intermediate store;
- tracks a lock operation of a well-behaved application executing on the at least one weakly-ordered processor;
- detects when an unlock operation corresponding to the lock operation is scheduled to release a lock operation; and
- in response to detecting the unlock operation is about to be performed to release the lock operation:
  - generates a sync instruction to be issued before the unlock operation is executed; and
  - issues the generated sync instruction before the processor executes the unlock operation, wherein the sync instruction guarantees visibility of all of the one or more intermediate store instructions to a point of coherency within the memory subsystem; and logic executing on the at least one weakly-ordered processor that:
- determines the value of the lock flag from among one of two values the lock flag can be set to, wherein a first value indicates that sync instructions are to be issued following each store operation, and wherein the second value indicates that sync instructions are not be issued following each store operation during a lock phase;
- detects when a well-behaved application is loaded for execution on the at least one weakly-ordered processor;
- in response to detecting loading of the well-behaved application on the at least one weakly-ordered processor, sets the lock flag to the second value; and
- in response to the lock flag being set to the first value, issues sync instructions following each store operation of the well-behaved application.

8. The multiprocessor data processing system of claim 7, wherein:
- said logic that tracks the lock operation comprises logic that tracks an address of a lock in response to initially obtaining the lock at the at least one weakly-ordered processor; and
- the unlock instruction is a subsequent store instruction issued from the at least one weakly-ordered processor, and which targets the address of the lock.

9. The multiprocessor data processing system of claim 8, wherein:
- said logic that tracks the address of the lock comprises logic that stores the address of the lock in a storage table of lock addresses; and
- said logic that determines whether the subsequent store instruction is an unlock instruction comprises logic that checks an address of the store instruction against the storage table of lock addresses for a match.

10. The multiprocessor data processing system of claim 7, wherein the LATU further comprises logic that:
- executes one or more store instructions of a well-behaved application on the at least one weakly-ordered processor.

11. The multiprocessor data processing system of claim 9, wherein the lock address tracking utility maintains the table of lock addresses.

12. The multiprocessor data processing system of claim 9, wherein in response to detecting the unlock operation has been executed, the lock address tracking utility removes a lock address corresponding to the lock instruction from the table of lock addresses.

* * * * *